Nov. 19, 1968

J. KASTNER ETAL 3,412,248

METHOD AND MEANS UTILIZING A PULSED ULTRAVIOLET
LASER FOR READOUT OF PHOTOLUMINESCENT
DOSIMETERS

Filed Nov. 19, 1965

Inventors
Jacob Kastner
Delbert N. Eggenberger
Louis Voyvodic
Attorney

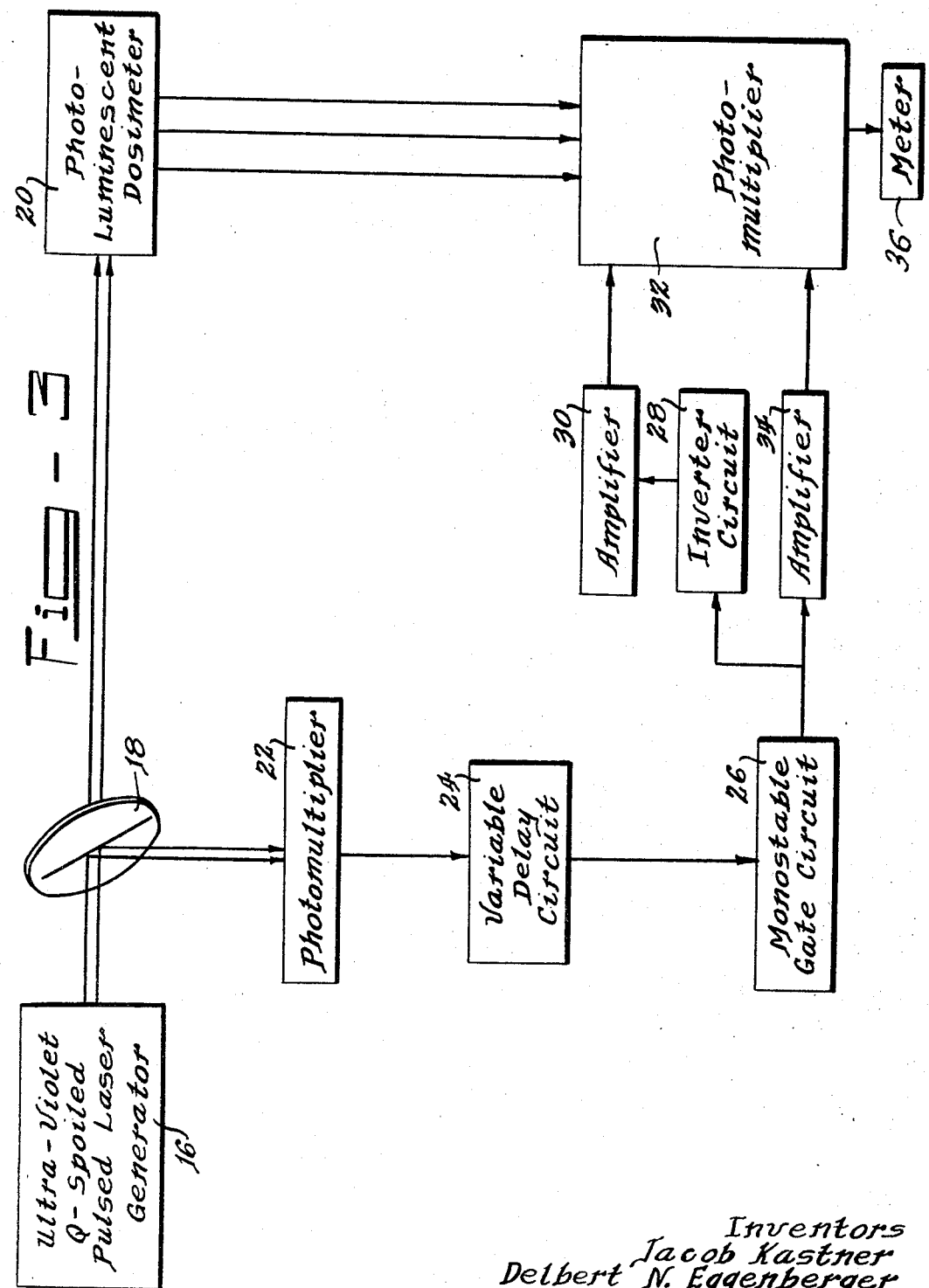

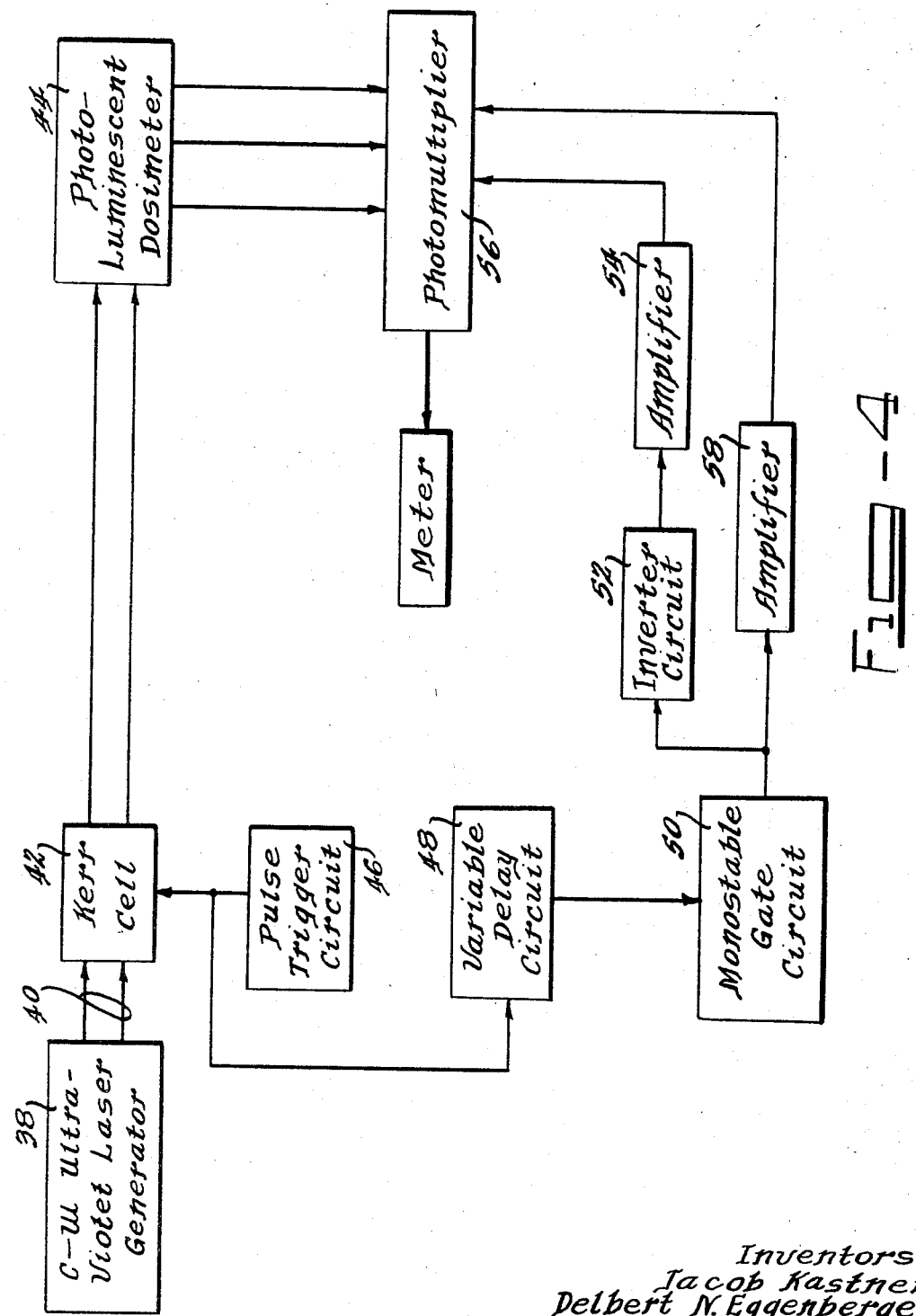

United States Patent Office 3,412,248
Patented Nov. 19, 1968

3,412,248
METHOD AND MEANS UTILIZING A PULSED
ULTRAVIOLET LASER FOR READOUT OF
PHOTOLUMINESCENT DOSIMETERS
Jacob Kastner, Park Forest, Delbert N. Eggenberger,
Downers Grove, and Louis Voyvodic, Hinsdale,
Ill., assignors to the United States of America as
represented by the United States Atomic Energy
Commission
Filed Nov. 19, 1965, Ser. No. 508,871
12 Claims. (Cl. 250—83.3)

ABSTRACT OF THE DISCLOSURE

A dosimetry readout system for photoluminescent material includes a pulsed ultraviolet laser beam focused upon the photoluminescent material whose output is detected by a first photomultiplier. Using a slotted mirror, the pulsed ultraviolet laser beam is also transmitted to a second photomultiplier whose output is delayed in time and fed to the first photomultiplier to control the operation thereof. The output of the second photomultiplier is delayed in time a period which is equal to the duration of the output pulse of the laser beam plus a duration greater than the time required for the decay of the component of the visible fluorescence of the photoluminescent dosimeter which is due to the predose or fluorescent background of the dosimeter. The output of the first photomultiplier, which is proportional to the radiation to which the photoluminescent material has been exposed, is then recorded.

This invention relates to photoluminescent dosimetry systems and more particularly to a method and means for readout of photoluminescent dosimeters. The invention described herein was made in the course of, or under, a contract with the U.S. Atomic Energy Commission.

Present readout systems for photoluminescent dosimeters comprise an ultraviolet lamp to which the dosimeter is exposed and a photomultiplier to detect light emitted from the dosimeter when exposed to the ultraviolet lamp. Since ultraviolet lamps also emit visible orange light, it is necessary in the present systems to use filters and optical geometries to avoid detection of the orange light from the ultraviolet. Further, when a dosimeter is excited by the ultraviolet, it gives off visible orange light which has two components. The first component is a natural visible orange light emitted by the dosimeter when exposed to ultraviolet and when the dosimeter has not been exposed to radiation. This orange light is commonly known as the predose or matrix fluorescent background of the dosimeter. The second component is visible orange light emitted by the dosimeter due entirely to radiation to which the dosimeter has been exposed. Present systems read the total output of the dosimeter and therefore read both of these components together without separating them. If the quantity of radiation to which the dosimeter is exposed is decreased, the ratio of radiation light output to predose light output decreases, with resulting inaccuracy in radiation measurement. Further, it is relatively obvious that, as the radiation dosage to which the dosimeter is exposed approaches the predose or fluorescent background of the dosimeter, the inaccuracies increase such that it becomes impossible to measure the radiation. Thus, present techniques of photoluminescent dosimetry are not suited for measurement of radiation in the microroentgen regions.

Accordingly, it is one object of the present invention to provide an improved method and means for dosimeter readout of photoluminescent dosimeters.

It is another object of the present invention to provide a method and means having a low signal-to-noise ratio for dosimetry readout of photoluminescent dosimeters.

It is another object of the present invention to provide a method and means for dosimetry readout of photoluminescent dosimeters wherein only radiation to which the dosimeter is exposed is measured.

It is another object of the present invention to provide a method and means for dosimetry readout of photoluminescent dosimeters wherein no filters are used.

It is yet another object of the present invention to provide a method and means for dosimetry readout of photoluminescent dosimeters which are capable of measuring microroentgen radiation dosages.

Other objects of the present invention will become more apparent as the detailed description proceeds.

In general, the present invention comprises generating a pulsed ultraviolet laser beam, focusing said pulsed laser beam on a photoluminescent dosimeter and measuring the light emitted by said photoluminescent dosimeter a predetermined time interval after generation of said pulsed laser beam.

Further understanding of the present invention may best be obtained by consideration of the accompanying drawings wherein:

FIG. 3 is a schematic diagram of an apparatus for the practice of the present invention.

FIG. 4 is a schematic diagram of an alternate apparatus for the practice of the present invention.

Figure 1:
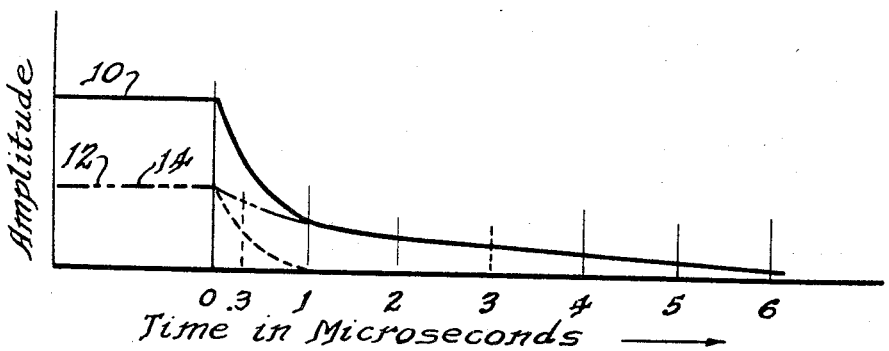
FIG. 1 is a graphical display of light output decay with respect to time of a photoluminescent dosimeter after removal of ultraviolet excitation.
Figure 2:
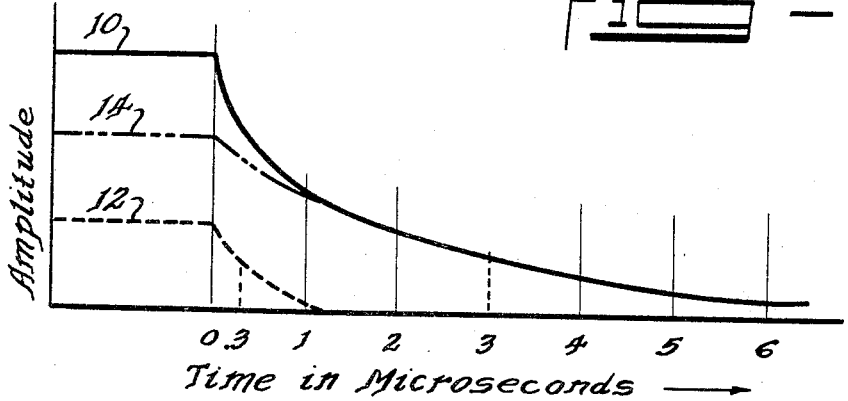
FIG. 2 is a graphical display of light output decay with respect to time of a photoluminescent dosimeter after removal of ultraviolet excitation.

The visible orange fluorescence of all photoluminescent dosimeters decays when ultraviolet light stimulation is removed therefrom. Reference is made to FIGS. 1 and 2 wherein this decay is illustrated for silver phosphate glass (50% $Al(PO_3)_3$, 25% $Ba(PO_3)_2$, 25% $KPO_3$ with 9% $AgPO_3$ added to the $KPO_3$ base). In FIG. 1, the amount of visible orange fluorescence of the dosimeter due to radiation to which the dosimeter has been exposed is equal in amplitude to that of the predose or fluorescent background of the dosimeter. In FIG. 2, for the same dosimeter as used in FIG. 1, the radiation to which the dosimeter was exposed was increased. Thus, the visible orange fluorescence due thereto is also increased. The predose or fluorescent background of the dosimeter remains constant regardless of the amount of radiation to which the dosimeter is exposed. The total visible orange fluorescent output of the dosimeter is indicated by line 10 in FIGS. 1 and 2. The predose or matrix fluorescent background of the dosimeter is indicated by line 11 in FIGS. 1 and 2. The visible orange fluorescence due to radiation to which the dosimeter was exposed is indicated by line 14 in FIGS. 1 and 2. It is to be noted that in FIG. 1, line 14 is identical with line 12 in amplitude, since the amount of radiation to which the dosimeter was exposed gave off an equal amount of visible fluorescence as the predose background of the dosimeter.

When the ultraviolet light stimulation is removed from the dosimeter, the visible fluorescence of the doismeter commences an exponential decay. The component of the visible light which is due to predose or fluorescent background of the dosimeter exponentially decays at a faster rate than the component of visible fluorescent light from the dosimeter which is due to radiation to which the dosimeter has been exposed. This is graphically illustrated in FIGS. 1 and 2 for the silver phosphate dosimeter. For a silver phosphate dosimeter the time constant $1/e$ for the exponential decay of the predose or fluorescent background is .3 microsecond and for the visible fluorescence due to radiation 3 microseconds. Thus, upon removal of ultraviolet excitation, the visible fluorescence due to predose or fluorescent background of the dosimeter rapidly decreases with respect to the visible fluorescent output due to radiation to which the dosimeter has been exposed. The present invention utilizes this decay relationship to effect an improved dosimeter readout system.

A dosimeter readout system for the practice of the present invention is schematically illustrated in FIG. 3. A commercial ultraviolet Q-spoiled pulsed laser generator 16 generates a pulsed ultraviolet Q-spoiled laser beam through a slotted mirror 18 to stimulate a photoluminescent dosimeter 20. The pulsed ultraviolet Q-spoiled laser beam is also reflected by the slotted mirror 18 to an ultraviolet-sensitive photomultiplier 22 which gives an output pulse responsive thereto. The output from photomultiplier 22 is fed to a conventional variable delay circuit 24. The output from variable delay circuit 24 is fed to a monostable gate circuit 26. The output from monostable gate circuit 26 is fed via an inverter circuit 28, amplifier 30, to a dynode of a photomultiplier 32. The output of monostable gate circuit 26 is also fed via amplifier 34 to a second dynode within the photomultiplier 32. Responsive to the output pulses from amplifiers 30 and 34, photomultiplier 32 is turned on to detect the decaying visible fluorescence of the dosimeter 20.

The variable delay circuit 24 is adjusted such that it delays the output from photomultiplier 22 a period which is equal to the duration of the output pulse from the laser generator 16 plus a duration greater than the time required for the decay of the component of the visible fluorescence of dosimeter 20 which is due to the predose or fluorescent background of the dosimeter 20. For the silver phosphate dosimeter, this period would be equal to the duration of the ultraviolet pulsed laser beam plus a time greater than one microsecond (approximately two microseconds). Thus, photomultiplier 32 will only see visible fluorescence due to radiation to which the dosimeter 20 was exposed and the readout will be independent of the predose or fluorescent background of the dosimeter 20. It is to be understood that the time constant for the exponential decay rates of the fluorescence from dosimeter 20 is constant for a particular material. It is to be further understood that for the practice of the present invention decay calibration charts are made for exposure of the dosimeter to known amounts of radiation, wherefrom the output of meter 36 is correlated to give a measurement of the radiation to which the dosimeter 20 has been exposed.

Reference is now made to FIG. 4 wherein is shown an alternate embodiment for the practice of the present invention. A generator 38 is used to generate a C–W ultraviolet laser beam 40 which is transmitted through a Kerr cell or Pockel cell 42 to a photoluminescent dosimeter 44. The Kerr cell 42 is triggered by a pulse trigger circuit 46 whereby the output from the Kerr cell 42 is a pulsed ultraviolet laser beam. The output from pulse trigger circuit 46 is also fed via delay circuit 48 to monostable gate circuit 50. The output from monostable gate circuit 50 is fed via an inverter circuit 52 and an amplifier 54 to a dynode of a photomultiplier 56. The output of monostable gate circuit 50 is also fed via amplifier 58 to a second dynode within photomultiplier 56. The outputs from amplifiers 54 and 58 gate on the photomultiplier 56 for a predetermined time interval whereby it detects the decaying visible fluorescence of the dosimeter 44.

The amount of delay occasioned the output from pulse trigger circuit 46 by variable delay circuit 48 should be equal to the duration of the pulse output from pulse trigger circuit 46 plus a duration greater than the time required for the decay of the component of the visible fluorescence of dosimeter 44 which is due to the predose or fluorescent background of the dosimeter 44. For the case of a silver phosphate dosimeter, the amount of delay occasioned the output of pulse trigger circuit 48 is equal to the duration of the output pulse from pulse trigger circuit 46 plus a time greater than one microsecond (approximately two microseconds). Thus, the photomultiplier 56 is triggered on after the predose or fluorescent background of the dosimeter 44 has decayed away.

It is to be noted that in the apparatus of FIGS. 3 and 4 the duration of the pulsed laser beam is not critical. However, particular attention must be paid to the quenching time of the laser beam (that is, the laser beam pulse must have a sharp trailing edge). The laser beam should be quenched in a time period which is less than the time constant of the predose or fluorescent background component of the visible fluorescence of the dosimeter.

It is to be noted that, with the inherent focusing capability of a laser beam, it is possible, using the apparatus of FIGS. 3 and 4, to read out very small size dosimeters (as small as a few microns in diameter). Further, though the embodiments of FIGS. 3 and 4 are shown with the dosimeter being read out normal to the laser beam, it is to be understood that the present invention should not be limited thereto. With the extreme collimation, and therefore directionality, of a laser beam, the dosimeter may be viewed for visible light normal to the laser beam whereby there is eliminated any possibility of seeing any incident light from the laser beam. Using the apparatus of FIGS. 3 and 4, radiation doses in the microroentgen region may be detected.

Though only the embodiment of FIG. 3 has been shown and described with an ultraviolet-sensitive photomultiplier and glass mirror combination for generating an electrical pulse responsive to the pulsed ultraviolet laser beam, such may be used with the apparatus of FIG. 4. Further, in the embodiment of FIG. 3, an electrical pulse responsive to the pulsed ultraviolet laser beam may be derived directly from the pulsed ultraviolet Q-spoiled laser beam generator 16.

Persons skilled in the art will, of course, readily adapt the general teachings of the present invention to methods and embodiments far different than the embodiments illustrated. Accordingly, the scope of the protection afforded the invention should not be limited to the particular methods and embodiments illustrated in the drawings and described above but should be determined only in accordance with the appended claims.

The embodiments of the invention in which an exclusive property or privilege is claimed are defined as follows:

1. A dosimetry readout system for photoluminescent material comprising means for generating a pulsed ultraviolet laser beam, means for focusing said pulsed ultraviolet laser beam on said photoluminescent material and means for measuring light emitted by said photoluminescent material a predetermined time interval after generation of said pulsed ultraviolet laser beam, which light is proportional to the radiation to which said material has been exposed.

2. The device according to claim 1 wherein said means for generating a pulsed ultraviolet laser beam comprises means for generating a continuous wave laser beam, a Kerr cell, means for mounting said Kerr cell to completely intersect said laser beam, means for exciting said Kerr cell to permit said laser beam to pass through said Kerr cell whereby a pulsed ultraviolet laser beam is generated.

3. The device according to claim 2 wherein said means for measuring the light of said photoluminescent material comprises means for generating an electrical pulse responsive to the excitation of said Kerr cell, means for delaying in time said generated electrical pulse a period equal to the time duration said Kerr cell is excited plus a time duration greater than the predose decay time of said photoluminescent material, a photomultiplier, means for mounting said photomultiplier to detect light emitted by said photoluminescent material, means for applying said delayed electrical pulse to said photomultiplier to activate said photomultiplier, and means for indicating the amount of light detected by said photomultiplier.

4. The device according to claim 3 wherein said photomultiplier is mounted in a direction normal to said pulsed ultraviolet laser beam to detect light emitted by said photoluminescent material.

5. A dosimetry readout system for a silver phosphate glass photoluminescent dosimeter comprising means for generating a pulsed ultraviolet laser beam, means for focusing said pulsed ultraviolet laser beam on said dosimeter to cause excitation thereof, means for generating an electrical pulse responsive to the occurrence of said pulsed ultraviolet laser beam, means for delaying in time said electrical pulse a period equal to the time duration of said pulsed ultraviolet laser beam plus two microseconds, a photomultiplier mounted normal to said pulsed ultraviolet laser beam to detect light emitted from said dosimeter, means for applying said delayed electrical pulse to said photomultiplier to cause activation thereof, and means for indicating the amount of light detected by said photomultiplier, which light is proportional to the amount of radiation to which the said dosimeter was exposed.

6. A dosimetry readout system for photoluminescent material comprising means for generating a pulsed ultraviolet Q-spoiled laser beam, means for focusing said pulsed ultraviolet Q-spoiled laser beam on said photoluminescent material and means for measuring light emitted by said photoluminescent material a predetermined time interval after generation of said pulsed ultraviolet Q-spoiled laser beam, which light is proportional to the amount of radiation to which said material has been exposed.

7. The device according to claim 6 wherein said means for measuring the light of said photoluminescent material comprises a first ultraviolet-sensitive photomultiplier, means for focusing said pulsed ultraviolet Q-spoiled laser beam on said first photomultiplier to generate an electrical pulse responsive thereto, means for delaying in time said generated electrical pulse equal to the time duration of said pulsed ultraviolet Q-spoiled laser beam plus a time duration greater than the predose decay time of said photoluminescent material, a second photomultiplier mounted to detect light emitted by said photoluminescent material, means for applying said delayed electrical signal to said second photomultiplier to activate said second photomultiplier, and means for indicating the amount of light detected by said second photomultiplier.

8. The device according to claim 7 wherein said second photomultiplier is mounted in a direction normal to said pulsed ultraviolet Q-spoiled laser beam to detect light emitted from said photoluminescent material and said means for focusing said pulsed ultraviolet Q-spoiled laser beam on said first photomultiplier comprises a slotted mirror mounted in said pulsed ultraviolet Q-spoiled laser beam to reflect said beam on said first photomultiplier and to transmit said beam to said photoluminescent material.

9. A method for reading out a photoluminescent material comprising the steps, generating a pulsed ultraviolet laser beam, exposing said photoluminescent material to said pulsed ultraviolet laser beam, and measuring the amount of light emitted by said photoluminescent material a predetermined time after generation of said pulsed ultraviolet laser beam, which light is proportional to the amount of radiation to which said material has been exposed.

10. The method according to claim 9 wherein the amount of light emitted by said photoluminescent material is measured at a time after generation of said pulsed ultraviolet laser beam which is greater than the predose decay time of said photoluminescent material.

11. The method according to claim 9 wherein the step generating said pulsed ultraviolet laser beam comprises generating a continuous wave ultraviolet laser beam, completely intersecting said ultraviolet laser beam with a Kerr cell and exciting said Kerr cell to periodically permit the passage therethrough of said ultraviolet laser beam.

12. The method according to claim 9 wherein the amount of light emitted by said photoluminescent material is measured in a direction normal to said pulsed ultraviolet laser beam.

References Cited
UNITED STATES PATENTS 3,136,889   6/1964   Clarke et al. _____ 250—71.5

RALPH G. NILSON, *Primary Examiner.*

S. ELBAUM, *Assistant Examiner.*